United States Patent
Minakuchi et al.

(10) Patent No.: US 11,267,946 B2
(45) Date of Patent: Mar. 8, 2022

(54) METHOD FOR PRODUCING POROUS MATERIAL OF WATER-SOLUBLE POLYMER

(71) Applicant: TOYOTA JIDOSHA KABUSHIKI KAISHA, Aichi (JP)

(72) Inventors: Akio Minakuchi, Okazaki (JP); Tomoyuki Uezono, Okazaki (JP); Hiroshi Uyama, Suita (JP); Chiaki Yoshizawa, Suita (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/425,117

(22) Filed: May 29, 2019

(65) Prior Publication Data

US 2019/0367699 A1  Dec. 5, 2019

(30) Foreign Application Priority Data

May 30, 2018 (JP) .............................. JP2018-103454

(51) Int. Cl.
*C08J 9/28* (2006.01)

(52) U.S. Cl.
CPC ......... *C08J 9/28* (2013.01); *C08J 2201/0504* (2013.01); *C08J 2301/10* (2013.01); *C08J 2301/28* (2013.01); *C08J 2329/04* (2013.01)

(58) Field of Classification Search
CPC .... C08J 5/18; C08J 9/28–286; C08J 2329/04; C08J 2429/04; B01D 67/0009–0016; B01J 20/305–3064; C08L 29/04

See application file for complete search history.

(56) References Cited

U.S. PATENT DOCUMENTS

| | | | |
|---|---|---|---|
| 4,663,358 A | 5/1987 | Hyon et al. | |
| 7,931,964 B2* | 4/2011 | Sethumadhavan | ....... B32B 3/26 428/315.7 |
| 2014/0072878 A1* | 3/2014 | Nemoto | ................. H01G 11/52 429/249 |
| 2014/0147726 A1 | 5/2014 | Toyoda | |
| 2015/0064572 A1* | 3/2015 | Carlson | ............... C04B 38/0074 429/251 |
| 2015/0249243 A1 | 9/2015 | Nagino et al. | |
| 2018/0175353 A1 | 6/2018 | Sakimoto et al. | |
| 2019/0198839 A1* | 6/2019 | Iwamuro | ............... H01M 50/44 |

FOREIGN PATENT DOCUMENTS

| | | | |
|---|---|---|---|
| CN | 103329311 A | 9/2013 | |
| CN | 104685670 A | 6/2015 | |
| CN | 104823307 A | 8/2015 | |
| EP | 2 749 588 A1 | 7/2014 | |
| JP | S4621446 B | 7/1971 | |
| JP | 6-78460 B2 | 10/1994 | |
| JP | 2000-208125 A | 7/2000 | |
| JP | 2012-251057 A | 12/2012 | |
| JP | 2014-132057 A | 7/2014 | |
| JP | 2014198835 A | 10/2014 | |
| JP | 2017-25294 A | 2/2017 | |
| JP | 2017-210565 A | 11/2017 | |
| JP | 2019117761 A * | 7/2019 | |
| WO | 95/12632 A2 | 5/1995 | |
| WO | WO-2011035689 A1 * | 3/2011 | ............ C08J 5/2275 |

OTHER PUBLICATIONS

EVAL Americas and Kuraray, Chemical and Solvent Barrier Properties of EVAL Resins. Technical Bulletin No. 180. Jul. 2000. (Year: 2000).*
Ethylene Glycol, Glycerol, and Water Information. ChemicalBook. http://www.chemicalbook.com. As viewed on Sep. 29, 2020. (Year: 2020).*
Ethylene Carbonate Information. ChemicalBook. http://www.chemicalbook.com. As viewed on Sep. 29, 2020. (Year: 2020).*
Gladysz, G. M.; Chawla, K. K. Voids in Materials: From Unavoidable Defects to Designed Cellular Materials. Elsevier. pp. 1-7. 2015. (Year: 2015).*
Machine Translation of application JP2017-252169. Filed Dec. 27, 2017. (Year: 2017).*
Y.S. Zhu et al., "Natural macromolecule based carboxymethyl cellulose as a gel polymer electrolyte with adjustable porosity for lithium ion batteries", Journal of Power Sources, vol. 288, pp. 368-375, 2015, 8 pages total.
Notice of Allowance dated Jan. 13, 2021, from the United States Patent and Trademark Office in U.S. Appl. No. 16/527,238.

* cited by examiner

*Primary Examiner* — Stephen E Rieth
(74) *Attorney, Agent, or Firm* — Sughrue Mion, PLLC

(57) ABSTRACT

The disclosure provides a very simple and convenient method for producing a porous material of a water-soluble polymer. The herein disclosed method for producing a porous material of a water-soluble polymer includes a step of preparing a solution in which a water-soluble polymer is dissolved in a mixed solvent of water mixed with a solvent having a boiling point higher than that of water, and a step of evaporating and thereby removing the mixed solvent from the solution. The solubility of the water-soluble polymer in the solvent having a boiling point higher than that of water is lower than the solubility of the water-soluble polymer in water. Voids are formed, in the step of evaporating and thereby removing the mixed solvent, by the solvent having a boiling point higher than that of water.

5 Claims, 1 Drawing Sheet

METHOD FOR PRODUCING POROUS MATERIAL OF WATER-SOLUBLE POLYMER

BACKGROUND OF THE INVENTION

1. Field of the Invention

The present disclosure relates to a method for producing a porous material of a water-soluble polymer. The present application claims priority to Japanese Patent Application No. 2018-103454 filed on May 30, 2018, the entire contents of which are incorporated into the present specification by reference.

2. Description of the Related Art

Porous materials of water-soluble polymers can exhibit a variety of properties, for example, light weight, cushioning characteristics, heat-insulating properties, sound absorption, separation properties, adsorption properties, and so forth. Porous materials of water-soluble polymers are thus used in a wide variety of applications such as, for example, packing and packaging materials, construction materials, sound-absorbing materials, cleaning products, cosmetic products, separation membranes, adsorbents, carriers for purification, catalyst carriers, and culture substrates.

Viewed in terms of, for example, production costs, the porous material of a water-soluble polymer is desirably produced by a simple and convenient method. As a simple and convenient method for producing a porous material of polyvinyl alcohol, which is the water-soluble polymer, Japanese Patent Application Laid-open No. 2012-251057 discloses a production method that includes a step of preparing a polyvinyl alcohol solution by adding a water-miscible first solvent to an aqueous polyvinyl alcohol solution while heating, obtaining a molded article by cooling the polyvinyl alcohol solution to induce precipitation, immersing the molded article in a second solvent, and replacing the water and/or the first solvent present in the molded article with the second solvent to obtain a porous material containing polyvinyl alcohol as its main component. The volume proportion between the water and the first solvent (first solvent/water) is 0.5 to 1.1.

SUMMARY OF THE INVENTION

As a result of intensive investigations, the present inventors have found that, with regard to the simple and convenient production of porous material, there is room for improvement in the aforementioned conventional production method.

An object of the present disclosure is therefore to provide a very simple and convenient method for producing a porous material of a water-soluble polymer.

The herein disclosed method for producing a porous material of a water-soluble polymer includes a step of preparing a solution in which a water-soluble polymer is dissolved in a mixed solvent of water mixed with a solvent having a boiling point higher than that of water, and a step of evaporating and thereby removing the mixed solvent from the solution. The solubility of the water-soluble polymer in the solvent having a boiling point higher than that of water is lower than the solubility of the water-soluble polymer in water. Voids are formed, in the step of evaporating and thereby removing the mixed solvent, by the solvent having a higher boiling point than that of water.

Porous material of a water-soluble polymer can be produced in accordance with this constitution through easy procedures, i.e., the preparation of a solution of the water-soluble polymer and the evaporation of water and porogenic solvent. A very simple and convenient method for producing a porous material of a water-soluble polymer is thus provided in accordance with this constitution.

DESCRIPTION OF THE PREFERRED EMBODIMENT(S)

Figure 1:
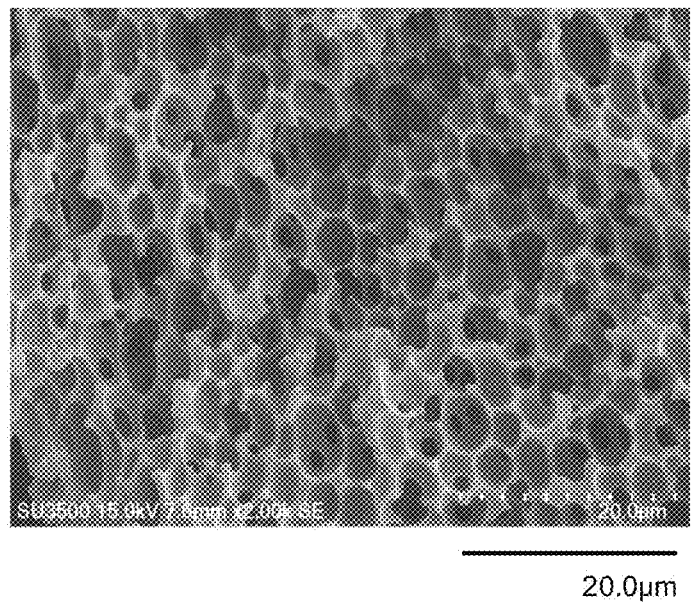
FIG. 1 is an SEM photograph of a cross section of the thin film obtained in Example 1.

The method according to the present disclosure for producing a porous material of a water-soluble polymer includes a step of preparing a solution in which a water-soluble polymer is dissolved in a mixed solvent of water mixed with a solvent having a boiling point higher than that of water (also referred to as the "aqueous solution preparation step" in the following), and a step of evaporating and thereby removing the mixed solvent from this solution (also referred to as the "mixed solvent removal step" in the following). The solubility of the water-soluble polymer in the solvent having a boiling point higher than that of water is lower than the solubility of the water-soluble polymer in water. Voids are formed, in the step of evaporating and thereby removing the mixed solvent, by the solvent having a boiling point higher than that of water.

The aqueous solution preparation step will be described first. There are no particular limitations on the water used in the present disclosure, but the use of deionized water, ultrafiltered water, reverse-osmosis water, distilled water, or ultrapure water is desired from the standpoint of preventing the admixture of impurities, while deionized water is more desired. The water is generally used in an amount that can completely dissolve the water-soluble polymer.

The solvent having a boiling point higher than that of water functions, for the last time, as a pore-forming agent (porogen) (this solvent having a boiling point higher than that of water is also referred to herebelow as a "porogenic solvent"). The porogenic solvent is mixed with water to form a mixed solvent. Thus, a porogenic solvent is used that is miscible up to at least a prescribed concentration. The boiling point of the porogenic solvent is higher than the boiling point of water (100° C.) and desirably is at least 100° C. higher than the boiling point of water (that is, the boiling point of the porogenic solvent is desirably at least 200° C.). The solubility of the water-soluble polymer in the porogenic solvent is lower than its solubility in water. The solubility of the water-soluble polymer at 25° C. in the porogenic solvent is desirably less than 1 mass %, more desirably not more than 0.5 mass %, and still more desirably not more than 0.2 mass %.

The value of the solubility parameter (SP value) of the porogenic solvent is not particularly limited. In order to have porosification develop in a more uniform manner, the solubility parameter of the porogenic solvent is desirably at least 5 $(cal/cm^3)^{1/2}$ smaller than the SP value of water (i.e., 23.4 $(cal/cm^3)^{1/2}$). Thus, the SP value of the porogenic solvent is desirably not greater than 18.4 $(cal/cm^3)^{1/2}$, is more desirably not less than 5 $(cal/cm^3)^{1/2}$ and not more than 16

(cal/cm³)¹/², and is still more desirably not less than 10 (cal/cm³)¹/² and not more than 15 (cal/cm³)¹/².

The type of the porogenic solvent is not particularly limited as long as the porogenic solvent can function as a pore-forming agent, has a higher boiling point than that of water, does not dissolve more water-soluble polymer than water, and is miscible with water up to at least a prescribed concentration. Advantageous examples of the porogenic solvent are carbonate compounds (particularly cyclic carbonate compounds) such as ethylene carbonate, propylene carbonate (particularly 2-oxo-4-methyl-1,3-dioxolane), and butylene carbonate (particularly 4-ethyl-1,3-dioxolan-2-one); lactone compounds (particularly γ-lactone compounds) such as γ-butyrolactone and γ-valerolactone; sulfone compounds such as dimethyl sulfone, diethyl sulfone, ethyl methyl sulfone, and sulfolane; dinitrile compounds such as malonitrile, succinonitrile, glutaronitrile, and adiponitrile; and diketone compounds such as 2,4-pentanedione. The porogenic solvent may be a chain compound, but is desirably a cyclic compound because this supports the facile formation of pores in the mixed solvent removal step discussed below, wherein cyclic carbonate compounds, lactone compounds, and sulfolane are desired. Moreover, viewed from the standpoint of facilitating the generation of uniform pores, the porogenic solvent is particularly desirably γ-butyrolactone or propylene carbonate.

The amount of use of the porogenic solvent is not particularly limited, but desirably at least 10 parts by mass and not more than 400 parts by mass of the porogenic solvent is used per 100 parts by mass of water. The state of the pores in the resulting porous material (for example, the porosity, pore diameter, and so forth) can be controlled by changing the amount of the porogenic solvent relative to the water.

The mixed solvent may further contain, within a range that does not significantly impair the effects of the present disclosure, a solvent other than water and the porogenic solvent.

In this specification, "water-soluble polymer" refers to a polymer that has a solubility in water at 25° C. of at least 1 mass %. The water-soluble polymer used for the present disclosure has a solubility in water at 25° C. desirably of at least 5 mass % and more desirably at least 10 mass %. The water-soluble polymer used for the present disclosure can be exemplified by hydroxyl group-containing water-soluble polymers such as polyvinyl alcohol-type polymers; amide group-containing water-soluble polymers such as polyvinylpyrrolidone, polyacrylamide, poly(N,N-dimethylacrylamide), poly(N-vinylacetamide), poly-N-isopropylacrylamide, polyoxazoline (for example, poly(2-methyl-2-oxazoline), poly(2-ethyl-2-oxazoline), and poly(2-propyl-2-oxazoline)), water-soluble polyamides, and water-soluble polyamideimides; ether bond-containing water-soluble polymers such as polyethylene glycol, polypropylene glycol, and polyvinyl methyl ether; amino group-containing water-soluble polymers such as polyethyleneimine, polyvinylamine, and polyallylamine; and carboxyl group-containing water-soluble polymers such as polyacrylic acid and polymethacrylic acid. Water-soluble polysaccharides such as the following may also be used as the hydroxyl group-containing water-soluble polymer: pullulan, amylose, starch, starch derivatives, cellulose ethers (for example, hydroxypropyl cellulose, hydroxyethyl cellulose, hydroxymethyl cellulose, and carboxymethyl cellulose), xanthan gum, chitosan, alginic acid, and hyaluronic acid. Carboxymethyl cellulose, alginic acid, and hyaluronic acid are also carboxyl group-containing water-soluble polymers. Chitosan is also an amino group-containing water-soluble polymer. The water-soluble polymer is desirably a hydroxyl group-containing water-soluble polymer and is more desirably a polyvinyl alcohol-type polymer or a cellulose ether and is still more desirably a polyvinyl alcohol-type polymer.

In this Specification, "polyvinyl alcohol-type polymer" refers to a polymer that contains the vinyl alcohol unit accounting for at least 50 mol % of the total monomer units. The polyvinyl alcohol-type polymer used in the present disclosure may thus include a monomer unit (also referred to below as the "other monomer unit") other than the vinyl alcohol unit. This other monomer unit can be exemplified by vinyl ester units, e.g., a vinyl acetate unit and so forth, as derived from vinyl esters for production. Thus, the polyvinyl alcohol-type polymer may be a polyvinyl alcohol having a degree of saponification of 100 mol %, but may also be a partially saponified polyvinyl alcohol. The degree of saponification of the polyvinyl alcohol-type polymer is desirably at least 60 mol %, more desirably at least 70 mol %, and still more desirably at least 80 mol %. The degree of saponification of the polyvinyl alcohol-type polymer can be measured, for example, in accordance with JIS K 6726: 1944. The following are additional examples of the other monomer unit: α-olefin units such as ethylene unit and propylene unit; (meth)acrylic acid units; (meth)acrylate ester units; unsaturated dicarboxylic acid units such as maleic acid unit, itaconic acid unit, and fumaric acid unit; vinyl ether units such as methyl vinyl ether unit and ethyl vinyl ether unit; nitrile units such as acrylonitrile unit and methacrylonitrile unit; and vinyl halide units such as vinyl chloride unit and vinyl fluoride unit.

The average degree of polymerization of the water-soluble polymer is not particularly limited, but is desirably not less than 80 and not more than 30,000 and is more desirably not less than 100 and not more than 20,000. The average degree of polymerization of the water-soluble polymer can be determined, for example, by NMR measurements.

The amount of use of the water-soluble polymer is not particularly limited, but the water-soluble polymer is desirably used at an amount of no less than 1 part by mass and no more than 40 parts by mass per 100 parts by mass of the water. The state of the pores in the resulting porous material (for example, the porosity, pore diameter, and so forth) can be controlled by changing the amount of the water-soluble polymer relative to the water (i.e., the concentration of the water-soluble polymer in the water).

The solution of the water-soluble polymer may further contain, within a range that does not significantly impair the effects of the present disclosure, components other than the water-soluble polymer and mixed solvent.

There are no particular limitations on the method for preparing the solution of the water-soluble polymer. An aqueous solution of the water-soluble polymer may first be prepared, and the porogenic solvent may be added thereto and mixed uniformly. The water-soluble polymer may be added to the mixed solvent of water and the porogenic solvent and dissolved thereinto. Heating may be carried out during preparation of the water-soluble polymer solution. The heating temperature is, for example, not less than 40° C. and not more than 100° C. After the preparation of the water-soluble polymer solution by heating, cooling may be performed within a range in which the water and porogenic solvent do not undergo separation. This cooling is desirably carried out in a range in which the water-soluble polymer does not precipitate. This is because the precipitated water-soluble polymer can function as an impurity.

The mixed solvent removal step is described in the following. The water and porogenic solvent are evaporated (volatilized in particular) and thereby removed in this mixed solvent removal step. Pores are formed by the porogenic solvent at this time. Typically, for example, pores are formed by phase separation between the water-soluble polymer and the mixed solvent in which the porogenic solvent has been brought to a higher concentration. Specifically, because the porogenic solvent has a higher boiling point than that of water, the water undergoes preferential evaporation versus the porogenic solvent in this step. The concentration of the porogenic solvent in the mixed solvent increases as the water decreases. Since the solubility of the water-soluble polymer in the porogenic solvent is lower than its solubility in the water, the water-soluble polymer undergoes phase separation from the mixed solvent in which the porogenic solvent has been brought to a higher concentration, and a porous framework of the water-soluble polymer is then formed. This phase separation may be a spinodal decomposition. Finally, the water is removed and the water-soluble polymer is precipitated. The higher boiling point porogenic solvent is evaporated and removed, and voids are thereby formed. A porous material of the water-soluble polymer can be formed proceeding in this manner. The types and use amount of the porogenic solvent should be appropriately selected in order to induce phase separation between the water-soluble polymer and the mixed solvent in which the porogenic solvent has been brought to a higher concentration.

There are no particular limitations on the method for evaporating the water and porogenic solvent, and, for example, a method of applying heat, a method of placing under reduced pressure, a method of applying heat under reduced pressure, and a method of air-drying can be used. These methods can be performed in the same manner as known drying methods. The method of applying heat is desired from the standpoint of the ease of implementation of the process. The heating temperature is not particularly limited, but is desirably a temperature at which the mixed solvent does not boil and the water-soluble polymer and porogenic solvent do not undergo decomposition, and is more desirably not less than 50° C. and not more than 150° C. The solution of the water-soluble polymer is desirably allowed to stand during which the water and porogenic solvent are evaporated.

In order to obtain the porous material in a desired shape, a method of introducing the solution of the water-soluble polymer into a vessel having a shape corresponding to the desired shape, and applying heat thereto is advantageously employed. In order to obtain a film-shaped porous material, a method of coating the solution of the water-soluble polymer in the form of a thin film on a flat sheet and applying heat thereto is advantageously employed.

A porous material of the water-soluble polymer can be obtained proceeding as described above. The obtained porous material of the water-soluble polymer can be used in a variety of applications in conformity with the type of the water-soluble polymer. Examples of these applications are packing and packaging materials, construction materials, sound-absorbing materials, cleaning products, cosmetic products, separation membranes, adsorbents, carriers for purification, catalyst carriers, culture substrates, and so forth.

The present disclosure enables the production of a porous material of a water-soluble polymer through easy procedures, i.e., preparation of a solution of the water-soluble polymer and evaporation of water and porogenic solvent. The present disclosure does not require the implementation, as in the prior art, of a cooling operation for precipitating a molded article and a solvent-substitution operation. The method according to the present disclosure for producing a porous material of a water-soluble polymer is thus very simple and convenient.

EXAMPLES

Examples pertaining to the present disclosure are described below, but this should not be construed to mean that the present disclosure is limited to or by that which is given in these examples.

Example 1

First, 2 parts by mass of polyvinyl alcohol, 10 parts by mass of water, and 5 parts by mass of propylene carbonate (2-oxo-4-methyl-1,3-dioxolane) as the porogenic solvent were added to a sample bottle. The sample bottle was heated to 80° C. to 90° C. and a polyvinyl alcohol solution was obtained by stirring until the polyvinyl alcohol was completely dissolved in the mixed solvent of water and porogenic solvent. The polyvinyl alcohol solution was then cooled to 25° C. The polyvinyl alcohol solution was coated by casting onto an aluminum plate. This was introduced into a dryer set to 70° C. and was heated in order to evaporate and remove the water and propylene carbonate. A thin film was obtained on the aluminum plate as a result. A cross section of the obtained thin film was subjected to observation with a scanning electron microscope (SEM), and it was confirmed thereby that the thin film was a porous material. An SEM photograph of a cross section of the thin film obtained in Example 1 is given in FIG. 1 for reference.

Example 2

A thin film was obtained by the same manner as in Example 1, but changing the 2 parts by mass of polyvinyl alcohol to 1 part by mass of hydroxymethyl cellulose and changing the amount of the propylene carbonate to 2 parts by mass. A cross section of the obtained thin film was subjected to observation with a scanning electron microscope (SEM), and it was confirmed thereby that the thin film was a porous material.

Example 3

Figure 2:
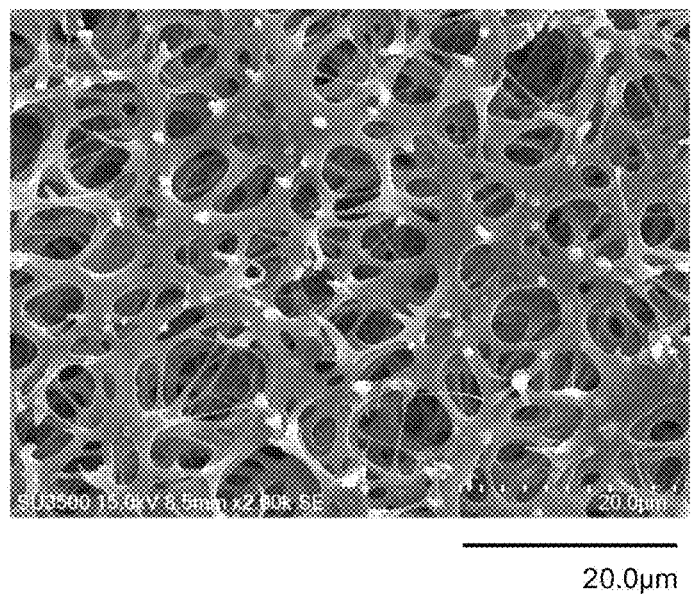
FIG. 2 is an SEM photograph of a cross section of the thin film obtained in Example 3.

A thin film was obtained by the same manner as in Example 1, but changing the 5 parts by mass of propylene carbonate as a porogenic solvent to 10 parts by mass of γ-butyrolactone and changing the set temperature of the dryer to 120° C. A cross section of the obtained thin film was subjected to observation with a scanning electron microscope (SEM), and it was confirmed thereby that the thin film was a porous material. An SEM photograph of a cross section of the thin film obtained in Example 3 is given in FIG. 2 for reference.

Example 4

A thin film was obtained by the same manner as in Example 1, but changing the 5 parts by mass of propylene carbonate as a porogenic solvent to 6 parts by mass of ethylene carbonate. A cross section of the obtained thin film was subjected to observation with a scanning electron microscope (SEM), and it was confirmed thereby that the thin film was a porous material.

Example 5

A thin film was obtained by the same manner as in Example 1, but changing the amount of water to 6 parts by mass and changing the 5 parts by mass of propylene carbonate as a porogenic solvent to 6 parts by mass of γ-valerolactone. A cross section of the obtained thin film was subjected to observation with a scanning electron microscope (SEM), and it was confirmed thereby that the thin film was a porous material.

Example 6

A thin film was obtained by the same manner as in Example 1, but changing the amount of water to 6 parts by mass and changing the 5 parts by mass of propylene carbonate as a porogenic solvent to 6 parts by mass of sulfolane. A cross section of the obtained thin film was subjected to observation with a scanning electron microscope (SEM), and it was confirmed thereby that the thin film was a porous material.

Comparative Example 1

A thin film was obtained by the same manner as in Example 1, but changing the 5 parts by mass of propylene carbonate as a porogenic solvent to 20 parts by mass of propylene glycol and changing the set temperature of the dryer to 55° C. The result of observation of a cross section of the obtained thin film with a scanning electron microscope (SEM) was revealed that porosification had not occurred.

Comparative Example 2

A thin film was obtained by the same manner as in Example 1, but changing the 5 parts by mass of propylene as a carbonate porogenic solvent to 10 parts by mass of 1,4-butanediol and changing the set temperature of the dryer to 60° C. The result of observation of a cross section of the obtained thin film with a scanning electron microscope (SEM) was revealed that porosification had not occurred.

Comparative Example 3

A thin film was obtained by the same manner as in Example 1, but changing the 5 parts by mass of propylene carbonate as a porogenic solvent to 10 parts by mass of dimethylformamide and changing the set temperature of the dryer to 60° C. The result of observation of a cross section of the obtained thin film with a scanning electron microscope (SEM) was revealed that porosification had not occurred.

Example 7

A thin film was obtained by the same manner as in Example 1, but changing the amount of water to 8 parts by mass and changing the 5 parts by mass of propylene carbonate as a porogenic solvent to 2 parts by mass of succinonitrile. A cross section of the obtained thin film was subjected to observation with a scanning electron microscope (SEM), and it was confirmed thereby that the thin film was a porous material.

Example 8

A thin film was obtained by the same manner as in Example 1, but changing the amount of water to 8 parts by mass and changing the 5 parts by mass of propylene carbonate as a porogenic solvent to 2 parts by mass of dimethyl sulfone. A cross section of the obtained thin film was subjected to observation with a scanning electron microscope (SEM), and it was confirmed thereby that the thin film was a porous material.

Example 9

A thin film was obtained by the same manner as in Example 1, but changing the amount of water to 8 parts by mass and changing the 5 parts by mass of propylene carbonate as a porogenic solvent to 4 parts by mass of butylene carbonate (4-ethyl-1,3-dioxolan-2-one). A cross section of the obtained thin film was subjected to observation with a scanning electron microscope (SEM), and it was confirmed thereby that the thin film was a porous material.

Example 10

A thin film was obtained by the same manner as in Example 1, but changing the 2 parts by mass of polyvinyl alcohol to 0.3 parts by mass of carboxymethyl cellulose and changing the propylene carbonate as a porogenic solvent to γ-butyrolactone. A cross section of the obtained thin film was subjected to observation with a scanning electron microscope (SEM), and it was confirmed thereby that the thin film was a porous material.

The results of the above are given in Table 1 (the "O" in the "porosification" column in the table indicates that porosification occurred, while the "X" indicates that porosification had not occurred). The results in Table 1 demonstrate that a porous material of a water-soluble polymer could be produced using the method according to the present disclosure.

TABLE 1

| | | porogenic solvent | | | | | | | | |
|---|---|---|---|---|---|---|---|---|---|---|
| | water-soluble polymer | name | structure | boiling point (° C.) | SP value | δd | δp | δh | HSP value | porosification |
| Example 1 | polyvinyl alcohol | propylene carbonate | cyclic | 242 | 13.3 | 20 | 18 | 4.1 | 27.2 | O |
| Example 2 | hydroxyethyl cellulose | propylene carbonate | cyclic | 242 | 13.3 | 20 | 18 | 4.1 | 27.2 | O |
| Example 3 | polyvinyl alcohol | γ-butyrolactone | cyclic | 204 | 12.6 | 18 | 16.6 | 7.4 | 25.6 | O |
| Example 4 | polyvinyl alcohol | ethylene carbonate | cyclic | 261 | 14.7 | 18 | 21.7 | 5.1 | 28.7 | O |
| Example 5 | polyvinyl alcohol | γ-valerolactone | cyclic | 207 | | | | | | O |
| Example 6 | polyvinyl alcohol | sulfolane | cyclic | 285 | 13.4 | 17.8 | 17.4 | 8.7 | 26.4 | O |
| Comparative | polyvinyl alcohol | propylene glycol | chain | 188.2 | 14.2 | 16.8 | 10.4 | 21.3 | 29.1 | X |

TABLE 1-continued

| | water-soluble polymer | porogenic solvent name | structure | boiling point (° C.) | SP value | δd | δp | δh | HSP value | porosification |
|---|---|---|---|---|---|---|---|---|---|---|
| Example 1 | | | | | | | | | | |
| Comparative Example 2 | polyvinyl alcohol | 1,4-butanediol | chain | 230 | 11.1 | 16.6 | 11 | 20.9 | 28.9 | X |
| Comparative Example 3 | polyvinyl alcohol | dimethylformamide | chain | 153 | 12.1 | 17.4 | 13.7 | 11.3 | 24.9 | X |
| Example 7 | polyvinyl alcohol | succinonitrile | chain | 266 | 12.8 | 18.2 | 17 | 7.9 | 26.1 | ○ |
| Example 8 | polyvinyl alcohol | dimethyl sulfone | chain | 238 | 14.6 | 19 | 19.4 | 12.3 | 29.8 | ○ |
| Example 9 | polyvinyl alcohol | butylene carbonate | cyclic | | 12.1 | 18 | 16.8 | 3.1 | 24.8 | ○ |
| Example 10 | carboxymethyl cellulose | γ-butyrolactone | cyclic | 204 | 12.6 | 18 | 16.6 | 7.4 | 25.6 | ○ |

What is claimed is:

1. A method for producing a porous material of a water-soluble polymer, comprising:

a step of preparing a solution in which the water-soluble polymer is dissolved in a mixed solvent of water mixed with a porogenic solvent, the porogenic solvent having a boiling point higher than that of the water; and a step of evaporating and thereby removing the mixed solvent from the solution to obtain the porous material, wherein the solubility at 25° C. of the water-soluble polymer in the porogenic solvent is lower than the solubility at 25° C. of the water-soluble polymer in the water, during the step of evaporating and thereby removing the mixed solvent from the solution, a porous framework of the water-soluble polymer is formed as a concentration of the porogenic solvent in the mixed solvent increases, the water-soluble polymer is precipitated as the water is removed, and voids are formed as the porogenic solvent is removed, the porogenic solvent is a carbonate compound, a lactone compound, a sulfone compound, or a dinitrile compound, the porous material consists essentially of the water-soluble polymer, and in the step of evaporating and thereby removing the mixed solvent from the solution, the solution consists of the water-soluble polymer, water, and the porogenic solvent.

2. The production method according to claim 1, wherein the difference between the boiling points of water and the porogenic solvent is at least 100° C.

3. The production method according to claim 1, wherein the porogenic solvent is γ-butyrolactone or propylene carbonate.

4. The production method according to claim 1, wherein the water-soluble polymer is a hydroxyl group-containing water-soluble polymer.

5. The production method according to claim 1, wherein the water-soluble polymer is a polyvinyl alcohol-type polymer.

* * * * *